AMPLIFIER WITH FLOATING INPUT

Original Filed April 4, 1968

INVENTOR
MELVIN O. EIDE

By Hofgren, Wegner, Allen, Stellman & McCord

ATTORNEYS

United States Patent Office

Re. 27,602
Reissued Mar. 20, 1973

27,602

AMPLIFIER WITH FLOATING INPUT

Melvin O. Eide, Bellevue, Wash., assignor to United Control Corporation, Redmond, Wash.

Original No. 3,482,175, dated Dec. 2, 1969, Ser. No. 718,797, Apr. 4, 1968. Application for reissue Nov. 9, 1970, Ser. No. 87,964
Int. Cl. H03f *3/04*
U.S. Cl. 33—24 17 Claims

Matter enclosed in heavy brackets [ ] appears in the original patent but forms no part of this reissue specification; matter printed in italics indicates the additions made by reissue.

ABSTRACT OF THE DISCLOSURE

An amplifier has an input floating with respect to ground and employs a resistor which is connected across the base-emitter junctions of two transistors in the amplifier. By matching the characteristics of the transistors, their base-emitter junction drops can be substantially equal so that the voltage drop across the input resistor is near zero. The potential of the floating input follows the output potential so that an input device or element may be maintained at the same potential as an output device.

BACKGROUND OF THE INVENTION

Field of invention

This invention relates in general to transistor amplifier circuits, and relates more particularly to such circuits having a floating input.

Description of the prior art

There are numerous applications for transistor amplifiers having floating inputs, and a number of circuits have been proposed. Most of such amplifiers use a differential input containing either a pair of differentially connected transistors or a transformer or some other devices. While such circuits are generally satisfactory from an operational standpoint, they do as a rule require a number of additional components and hence lack the simplicity desired in many circuits. Additionally, in such prior art amplifiers, the input is not electrically tied to the output, so that potential differences appear there across.

SUMMARY OF THE INVENTION

In accordance with the present invention, there is provided a transistor amplifier having a floating input utilizing an input resistor. This input resistor is connected to two transistors in the amplifier in such a manner that the base-emitter junction potentials of these transistors oppose each other across the input resistor. This results in a substantially constant voltage drop which approaches zero across this input resistor at all times. This also results in elimination of any input offset voltage under no load conditions, which is a desirable property in an amplifier circuit.

The circuitry of this amplifier is particularly useful in applications where it is desired to have the input potential closely follow the output potential. An example of such an application is in a force balance accelerometer in which movement of one element of a differential capacitor is used to sense acceleration and provide a signal which is amplified and supplied to a torque coil. The torque coil provides a force which acts to restore the movable element to the null position, and the current required to provide this restoration is a measure of the acceleration involved. In this application it is desirable to avoid any potential difference between the capacitor sensing element and the torque coil, since they are electrostatically coupled together through stray capacitance. By using the amplifier of the present invention in this application, the potential of the torque coil and that of the capacitor element are always the same because the input and output of the amplified are rigidly tied together. This prevents the occurrence of linearity errors due to electrostatic forces associated with a potential difference between the capacitor sensing element and the torque coil.

It is therefore an object of the present invention to provide an amplifier having a floating input in which the input potential follows the output potential.

It is an additional object of this invention to provide an amplifier having a floating input without requiring the use of differential elements therein.

It is a further object of the present invention to provide an amplifier having a floating input including an input resistor, the voltage across the input resistor being substantially constant and near zero to reduce or eliminate any input offset voltage.

It is a further object of this invention to provide an amplifier with a floating input which is reliable, rugged and utilizes a minimum number of components.

Objects and advantages other than those set forth above will be apparent from the following description when read in connection with the accompanying drawing, in which:

DESCRIPTION OF THE PREFERRED EMBODIMENT

Figure 1:
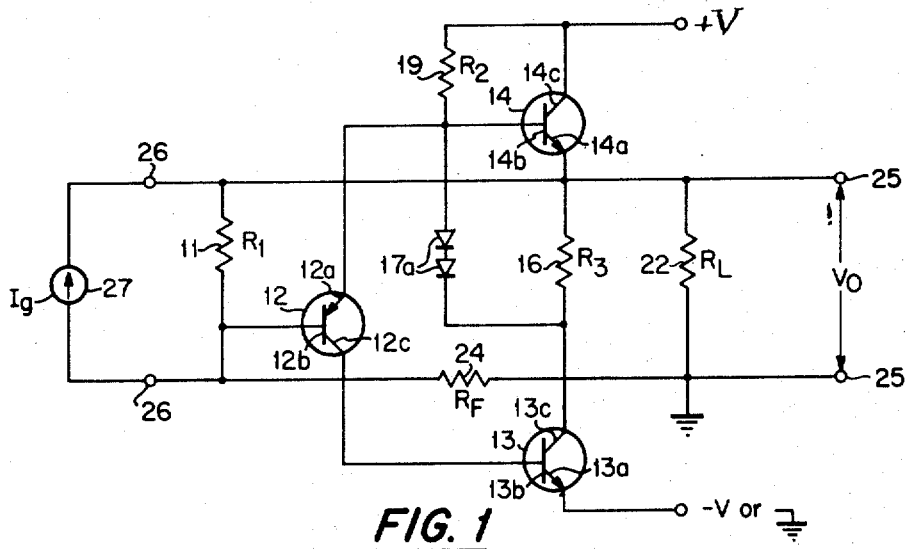
FIG. 1 is a schematic diagram of the preferred embodiment of the amplifier of this invention.

Referring to FIG. 1, the amplifier includes an input resistor 11, identified as $R_1$ which is connected to the transistors of the amplifier so as to maintain the voltage across the input resistor at a constant value near zero. The transistors in the amplifier are identified by reference characters 12, 13, 14, the transistors having emitters 12a, 13a, 14a, and bases 12b, 13b, 14b, and collectors 12c, 13c, 14c.

Collector 13c is connected to emitter 14a through a resistor 16 identified as $R_3$. A pair of diodes 17a are connected between the junction of collector 13c with resistor 16 and base 14b of transistor 14. A resistor 19, identified as R2, is connected between base 14b and collector 14c, and this collector is connected to a terminal 21 representing a +V source of voltage.

A load resistor 22, identified as $R_L$, has one terminal connected to emitter 14a and has its other terminal connected through a feedback resistor 24, identified as $R_F$, to the lower terminal of input resistor 11. A pair of output terminals 25 are connected across load resistor 22.

The amplifier receives a suitable input at a pair of input terminals 26, and this input may be from a current source represented by source 27 which supplies a current $I_g$ to the amplifier input. Alternatively, the input may be a voltage source connected to input terminals 26 through a series resistor.

The operation of the circuit may be best understood from the following considerations. It will be seen from FIG. 1 that input resistor 11 is connected between base 12b of transistor 12 and emitter 14a of transistor 14, and that emitter 12a is connected to base 14b. Thus, the base-emitter junction potentials of transistors 12, 14 are connected in opposition to each other across resistor 11, so that the potential across resistor 11 will be the difference between these base-emitter junction potentials. By proper selection and matching of the characteristics of transistors 12, 14, the potential across resistor 11 will approach the ideal value of zero, and will maintain this value with temperature and time. Thus, when the floating input source is referred to the output, the potential difference across resistor 11 is very small, and ideally is zero because of the cancelling effects of the base-emitter junction potential of transistors 12, 14.

Figure 2:
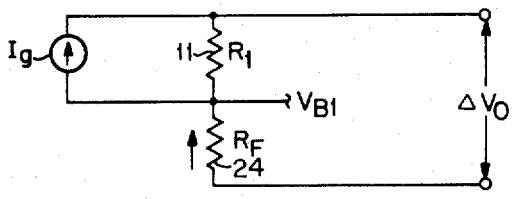
FIG. 2 is a schematic diagram of the equivalent circuit of the amplifier of FIG. 1.

Under these conditions, the input current $I_g$ will flow through feedback resistor 24 and not through input resistor 11. This can be shown mathematically by considering the equivalent circuit of FIG. 2:

$$\frac{\Delta V_0}{\Delta V_i}=A_0;\ \Delta V_{B1}=\Delta(V_0-V_i);\ \Delta V_i=\frac{\Delta V_0}{A_0}$$

where $\Delta V_i$ is the voltage developed across $R_1$ due to $I_g$, and $A_0$ is the open loop voltage gain of the circuit.

$$\Delta V_{B1}=\Delta V_0\left(1-\frac{1}{A_0}\right),\ \text{and}\ \Delta V_{Bi}$$

$$\approx \Delta V_0 \text{ for } A_0 \text{ greater than 40 or 50.}$$

$$\Delta I_f=\Delta\left(\frac{0-V_{B1}}{R_f}\approx-\frac{\Delta V_0}{R_f}\right. \text{ for } A_0 \text{ large.}$$

$$\frac{\Delta V_0}{\Delta I_f}=-R_f;\ \Delta I_f=\Delta I_g \text{ if } \Delta V_0\rightarrow\Delta V_{B1}.$$

$$\frac{\Delta V_0}{\Delta I_g}=-R_f.$$

Thus, it can be seen that the output voltage is proportional to the input current and may be expressed as the input current times the resistance of the feedback resistor.

To further understand the circuit operation, assume that current source 27 is injecting a current into the node described by the junction of resistor 11, resistor 24 and base 12b of transistor 12. Since transistor 12 does not have infinite gain, some small portion of the current $I_g$ generated by source 27 must be injected into base 12b. This increase in base current will result in an increase in the collector current in transistor 12, the amount of this increase being determined by the common emitter current gain of transistor 12, commonly identified as beta.

It will be seen that the collector current of transistor 12 is the base drive current for transistor 13, so that an increase in the base current of transistor 12 results in an increase in the collector current of transistor 12, to produce an increase in the base current of transistor 13. This increase in the base current of transistor 13 produces a corresponding increase in the collector current of transistor 13.

The collector current of transistor 13 flows through both resistor 16 and diodes 17a, and produces a substantially constant voltage drop across resistor 16 for the following reason. The voltage drop across resistor 16 is equal to the voltage drop across diodes 17a minus the base-emitter junction potential of transistor 14. By proper choice of diodes 17a and transistor 14, the voltage drop across one of the diodes can be made equal to the base-emitter junction potential of the transistor, so that the resultant voltage drop across resistor 16 is equal to the voltage drop across the other of the diodes. Alternatively, a single diode could be selected having a voltage drop twice that of the base-emitter junction potential of transistor 14, so that the voltage drop across resistor 16 would be one-half of that across the single diode.

Thus, the voltage drop across resistor 16 remains substantially constant, and if the collector current of transistor 13 should change, then this change in current will flow substantially entirely through diodes 17a and not through resistor 16. If the current gain of transistor 14 is reasonably large as is generally true for present day transistors, then this change in collector current from transistor 13 will flow almost entirely in resistor 19. Under these circumstances, resistor 19 is essentially the collector load impedance for transistor 13. In the other words, any voltage difference which appears at the output or emitter of transistor 14 is essentially equal to the change in collector current of transistor 13 times the resistance of resistor 19. In this situation, it is possible to connect load resistor 22 between emitter 14a and ground and have very little effect on the gain of the amplifier. That is, regardless of the size of the load resistor 22 (within practical limits), the load impedance for transistor 13 remains essentially that of resistor 19. This permits obtaining a high voltage gain from the amplifier with a relatively small load resistor. In a practical example, load resistor 22 may have a resistance of 3000 ohms, while resistor 19 has a resistance of 20,000 ohms.

In connection with the above, it is important to design the circuit so that the essentially constant current flow in resistor 16 is larger than the maximum current which will flow in load resistor 22 when the output of the amplifier is negative. If this factor is not observed and the current flow through load resistor 22 for a negative output from the amplifier exceeds the current in resistor 16, the current in resistor 16 will tend to increase and thereby shut off transistor 14. This would have the undesired effect that transistor 13 would no longer see resistor 19 at its collector load but would see the load resistor 22.

Figure 3:
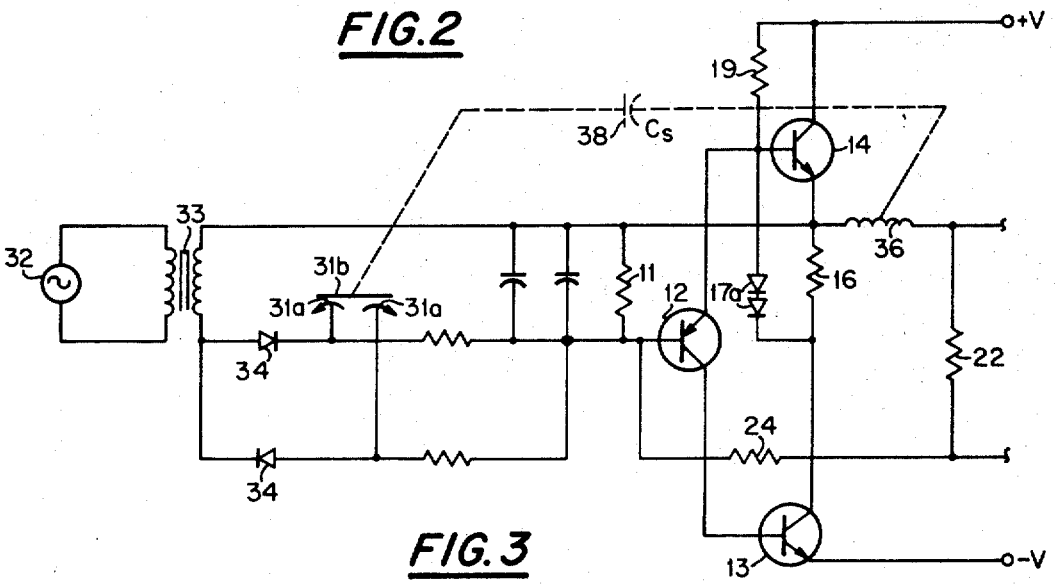
FIG. 3 is a schematic diagram of the amplifier of FIG. 1 utilized in a force balance accelerometer system.

As indicated above, the amplifier of the present invention is particularly adapted for use in a force balance accelerometer system, and such a system is shown schematically in FIG. 3. Such a system includes a differential capacitor having a pair of outer plates 31a and a center or common plate 31b. Plate 31b is rigidly fixed to the moving transducer element, which would be a seismic member in the case of a force balance accelerometer. Energy is supplied to the capacitor from a high frequency oscillator 32 through a transformer 33 and rectifiers 34. Variations in the position of the movable member produce variations in the capacitor output, and this signal is amplified in the amplifier of this invention and supplied to a torque coil 36. The current through torque coil 36 acts to restore the movable element to its null position, and the current required in coil 36 to produce this restoration is a measure of the acceleration which the movable element has undergone.

To avoid the use of additional hairsprings, the transducer mechanism is designed so that center capacitor plate 31b is electrostatically coupled to torque coil 36 through stray capacitance, represented by capacitor 38 and the broken line connecting plate 31b and coil 36. If there were significant potential differences between the input capacitor and torque coil as the torque coil moved with respect to ground, such differences could produce serious linearity errors due to the electrostatic forces involved.

However, by utilizing the amplifier of this invention, in which the floating input thereof is tied to the output, the differential capacitor is forced to electrostatically track the torque coil, thus preventing the appearance of potential differences between which might produce linearity errors.

Thus, the amplifier of the present invention is operable to maintain its input tied to its output, and also results in substantially no signal across the input resistor for no signal input, thereby eliminating an input offset voltage.

Although the amplifier has been illustrated employing bipolar transistors, it will be apparent that it may be constructed using field effect transistors, providing proper care is taken in their selection to insure that they have complementary characteristics to produce the desired cancelling effect across the input resistor.

By way of example, and without limiting the scope of the invention, it has been found that an amplifier as shown in FIG. 1 constructed of the following components operated in a highly satisfactory manner.

| | | |
|---|---|---|
| Transistor **12** | | 2N2605 |
| Transistor **13, 14** | | 2N2484 |
| Diodes **17a** | | 1N4148 |
| $R_1$ and $R_2$ | ohms | 20,000 |
| $R_3$ | do | 150 |
| $R_F$ | megohm | 1 |
| $R_L$ | ohms | 3000 |

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A transistor amplifier comprising:

an input resistor;

a plurality of transistors, each of said transistors having a base, an emitter and a collector;

means connecting one side of said input resistor to the base of one of said transistors which is of a first conductivity type and the other side of said input resistor to the emitter of another of said transistors which is of another conductivity type;

means connecting the emitter of said one transistor to the base of said another transistor whereby the base-emitter junction potentials of said transistors are connected in opposition to each other across said input resistor;

an input circuit connected to said input resistor; and an output circuit connected to the emitter of said another transistor, said input circuit being floating with respect to said output circuit.

2. A transistor amplifier in accordance with claim 1 including a third transistor connected betewen the collector of said one transistor and said another transistor.

3. A transistor amplifier in accordance with claim 2 including:

a load resistor connected to said output circuit; and a feedback resistor connected between said load resistor and said input resistor.

4. A transistor amplifier in accordance with claim 3 in which said third transistor has a base, a collector and an emitter, said base of said third transistor being connected to said collector of said one transistor;

first resistance means connected between said collector of said third transistor and said emitter of said another transistor;

constant voltage means connected between said collector of said third transistor and said base of said another transistor;

second resistance means connected between said base of said another transistor and said collector of said another transistor, whereby the voltage across said first resistance means is substantially constant and said second resistance means appears as the load for said third transistor.

5. A transistor amplifier in accordance with claim 4 in which said constant voltage means comprises diode means.

6. A transistor amplifier in accordance with claim 5 in which said diode means includes a pair of diodes, each of said diodes having a constant voltage thereacros substantially equal to the base-emitter junction potential of said another transistor, whereby the voltage drop acros said first resistance means is substantially equal to the voltage across one of said diodes.

7. A transistor amplifier in accordance with claim 6 in which said input circuit includes a current source connected across said input resistor, and said output circuit includes said load resistor connected between said emitter of said another transistor and ground.

8. A transistor amplifier comprising:

a pair of input terminals and a pair of output terminals;

input resistance means connected between said input terminals;

first transistor means of a first conductivity type having its base coupled to one side of said input resistance means;

second transistor means of another conductivity type having its emitter connected to the other side of said resistance means and to one of said output terminal means and having its base directly coupled to the emitter of said first transistor means whereby the base-emitter junction potentials of said transistors are connected in opposition to each other across said input resistance means;

load resistance means coupled acros said output terminal means; and feedback resistance means coupling said one side of said input resistance means to the other of said output terminal means.

9. A transistor amplifier as recited in claim 8 wherein the collector of said first transistor means is directly coupled to the base of a third transistor means of said other conductivity type which has its collector connected through a third resistance means to the emitter of said second transistor means.

10. A transistor amplifier as recited in claim 9 wherein the base of said second transistor means is also connected to the collector of said third transistor means through a pair of diode means and the base and collector of said second transistor means are interconnected through a fourth resistance means.

*11. An amplifier with a floating input comprising:*

*an input circuit including a sensing mechanism having two members, one relatively movable with respect to the other, for providing a signal in response to variations in the relative positions of the members;*

*an output circuit including restoring means operatively associated with the sensing members for restoring the members to a null position in response to current flow through the restoring means;*

*amplifier means having an input and an output;*

*means connecting the input of said amplifier means to said input circuit and the output of said amplifier means to said output circuit for providing current flow to said restoring means in response to said signal, said connecting means including*

*means for maintaining the input circuit tied to the output circuit to force the transducer mechanism to track the restoring means, including*

*signal coupling means forming a common path between said sensing mechanism and said restoring means to prevent a potential difference therebetween, whereby said input circuit is floating with respect to said output circuit.*

*12. An amplifier in accordance with claim 11 in which said signal coupling means comprises stray capacitance forming the sole electrical path between one of said sensing members and said restoring means.*

*13. An amplifier in accordance with claim 11 in which said sensing mechanism comprises a differential capacitor having a pair of plate sections corresponding to a first of said two members and a common capacitor plate spaced from said pair of plate sections and corresponding to a second of said two members, said input circuit including an AC oscillator, means connecting one side of said AC oscillator to said pair of plate sections, and said signal coupling means completing a path between said common capacitor plate and said other side of said oscillator.*

*14. An amplifier with a floating input comprising:*

*an input circuit including a sensing mechanism having two members, one relatively movable with respect to the other, for providing a signal in response to variations in the relative positions of the members;*

*an output circuit including restoring means operatively associated with the sensing members for restoring the members to a null position in response to current flow through the restoring means;*

*amplifier means having an input and an output;*

*means connecting the input of said amplifier means to said input circuit and the output of said amplifier means to said output circuit for providing current flow to said restoring means in response to said signal, said connecting means including*

*stray capacitance means forming the sole electrical path between one of said sensing members and said restoring means, whereby said input circuit is floating with respect to said output circuit.*

*15. An amplifier in accordance with claim 14 in which said amplifier means includes transistors each having a base, an emitter and a collector, said connecting means connecting said input circuit to an input resistor for developing said signal thereacross, said amplifier means includes means connecting one side of said input resistor to the base of one of said transistors which is of a first conductivity type and the other side of said input resistor to the emitter of another of said transistors which is of another conductivity type, and further connecting the emitter of said one transistor to the base of said another transistor whereby the base-emitter junction potentials of said transistors are connected in opposition to each other across said input resistor, and said connecting means connecting said output circuit to the emitter of said another transistor.*

*16. An amplifier in accordance with claim 14 in which said input circuit includes impedance means connected between one of said sensing members and the input of said amplifier means and said stray capacitance means forms an electrical path between the other of said sensing members and said restoring means.*

*17. An amplifier in accordance with claim 14 in which said sensing mechanism comprises a differential capacitor having a pair of plate sections corresponding to a first of said two members and a common capacitor plate spaced from said pair of plate sections and corresponding to a second of said two members, said input circuit including an AC oscillator, means connecting one side of said AC oscillator to said pair of plate sections, and said stray capacitance means completing a path between said common capacitor plate and said other side of said oscillator.*

References Cited

The following references, cited by the Examiner, are of record in the patented file of this patent or the original patent.

UNITED STATES PATENTS

| | | | |
|---|---|---|---|
| 3,001,144 | 9/1961 | Dandl | 330—24 X |
| 3,246,251 | 4/1966 | Sheppard | 330—15 X |

OTHER REFERENCES

Aronson et al.: "Transistor Audio Frequency Amplifier," RCA Technical Notes, TN No. 36, Aug. 9, 1957.

ROY LAKE, Primary Examiner

L. J. DAHL, Assistant Examiner

U.S. Cl. X.R.

330—17, 32